(12) United States Patent
Nishi

(10) Patent No.: US 10,197,989 B2
(45) Date of Patent: Feb. 5, 2019

(54) ROBOT CONTROLLER OF ROBOT USED WITH MACHINE TOOL, AND PROCESSING SYSTEM

(71) Applicant: FANUC Corporation, Yamanashi (JP)

(72) Inventor: Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 230 days.

(21) Appl. No.: 14/825,246

(22) Filed: Aug. 13, 2015

(65) Prior Publication Data

US 2016/0054723 A1 Feb. 25, 2016

(30) Foreign Application Priority Data

Aug. 20, 2014 (JP) .................................. 2014-167625

(51) Int. Cl.
*G05B 19/408* (2006.01)
*B25J 9/16* (2006.01)
*G05B 19/418* (2006.01)

(52) U.S. Cl.
CPC .......... *G05B 19/408* (2013.01); *B25J 9/1687* (2013.01); *G05B 19/41825* (2013.01); *G05B 2219/39105* (2013.01); *G05B 2219/45064* (2013.01); *Y02P 90/087* (2015.11); *Y02P 90/18* (2015.11); *Y10S 901/02* (2013.01); *Y10S 901/41* (2013.01)

(58) Field of Classification Search
CPC . G05B 19/408; G05B 19/41825; B25J 9/1687
See application file for complete search history.

(56) References Cited

U.S. PATENT DOCUMENTS 8,914,140 B2 12/2014 Singh et al.
8,922,641 B2 * 12/2014 Bertin .............. G01N 21/95607
348/135

(Continued)

FOREIGN PATENT DOCUMENTS

CN 201156344 Y 11/2008
CN 102736602 A 10/2012

(Continued)

*Primary Examiner* — Vincent H Tran
(74) *Attorney, Agent, or Firm* — Hauptman Ham, LLP

(57) ABSTRACT

A robot controller configured to manage production management information of a machine tool and transmit the information to an upper-level computer, and a processing system including the machine tool, the robot and the robot controller. When a processing-start notification and/or a workpiece exchange-request is transmitted, at least a part of the production management information held by the machine tool is transmitted to the robot controller via a first network. The robot controller combines the production management information of the machine tool and other production management information held by the robot controller, and stores the combined production management information as substantially one production management information. After that, when the upper-level computer requests the robot controller or the machine tool to transmit the product management information, the production management information stored in the robot controller is transmitted to the upper-level computer via a second network.

2 Claims, 2 Drawing Sheets

(56) References Cited

U.S. PATENT DOCUMENTS

| | | | | |
|---|---|---|---|---|
| 2002/0180960 A1* | 12/2002 | Koren | ................ | G01N 21/8803 356/237.2 |
| 2003/0014145 A1* | 1/2003 | Reiss | ............... | G05B 19/41865 700/121 |
| 2005/0120536 A1* | 6/2005 | Kilibarda | ........... | B23K 37/0443 29/430 |
| 2005/0256788 A1* | 11/2005 | Mukai | .................. | G06Q 10/087 705/29 |
| 2010/0256793 A1* | 10/2010 | Lee | ................. | G05B 19/41875 700/108 |
| 2010/0305758 A1* | 12/2010 | Nishi | .................... | B23Q 17/00 700/264 |
| 2012/0078410 A1* | 3/2012 | Wong | ............... | G06Q 10/06395 700/110 |
| 2013/0317637 A1* | 11/2013 | Singh | .................... | G05B 17/02 700/97 |
| 2014/0260104 A1* | 9/2014 | Ackley | ................. | B07C 5/3422 53/443 |
| 2014/0267691 A1* | 9/2014 | Humphrey | .............. | G06T 7/001 348/125 |
| 2014/0277733 A1* | 9/2014 | Kouno | ............... | H05B 33/0854 700/259 |
| 2015/0032257 A1* | 1/2015 | Hashiguchi | ........ | G05B 19/4184 700/248 |

FOREIGN PATENT DOCUMENTS

| | | |
|---|---|---|
| CN | 103406905 A | 11/2013 |
| CN | 103649993 A | 3/2014 |
| CN | 103987496 A | 8/2014 |
| JP | 4-217008 A | 8/1992 |
| JP | H11-123630 A | 5/1999 |
| JP | 11-198074 A | 7/1999 |
| JP | 2006-039946 A | 2/2006 |
| WO | 2010/149185 A1 | 12/2010 |

* cited by examiner

ROBOT CONTROLLER OF ROBOT USED WITH MACHINE TOOL, AND PROCESSING SYSTEM

RELATED APPLICATIONS

The present application claims priority to Japanese Application Number 2014-167625, filed Aug. 20, 2014, the disclosure of which is hereby incorporated by reference herein in its entirety.

BACKGROUND OF THE INVENTION

1. Field of the Invention

The preset invention relates to a robot controller for controlling a robot configured to supply and eject a workpiece processed by a machine tool, and relates to a processing system including the machine tool, the robot and the robot controller.

2. Description of the Related Art

When machine processing is carried out by using a machine tool, it is conventional to manage production control information relating to the machine tool by using an upper-level computer, in order to maintain processing quality. In detail, in a well-known method, the upper-level computer is connected to the machine tool via a network, actual production information, etc., is periodically transmitted from the machine tool to the upper-level computer, and the upper-level computer summarizes the transmitted information.

As relevant prior art documents, JP H11-123630 A discloses an NC device having an input means for an operator to input information; a display means capable of displaying a character and a figure; a communication means for transmitting and receiving information between a production control computer and the NC device; a display control means for displaying a notification information file which is a shared file in the production control computer on the display means; and a reply management means which writes reply information to the notification information, in a reply column arranged in the notification information file.

Further, JP 2006-039946 A discloses a production management system, wherein a signal is generated by sensing that processing of specific components have been completed by a plurality of machine tools configured to perform the same or the same kind of machining by using a sensor; the generated signal is input to a measurement controller; one set of measurement signal including a plurality of signals accumulated by the measurement controller is transmitted to a serial interface; the serial signal is transmitted to a network controller; and a personal computer, etc., accesses the network controller by an Ethernet (R) connection method so as to read production information in real-time.

Recently, a robot is often used to supply a workpiece to a machine tool before processing, and to eject the workpiece from the machine tool after processing. Further, the robot may be used to check processing accuracy of the processed workpiece, and may be used to exchange a work tool of the machine tool.

When supplying or ejecting a workpiece to or from a machine tool by using a robot, some production management information can be obtained only on the robot side. For example, when a supplying place and an ejecting place for the workpiece are detected by using a vision sensor attached to the robot, in order to obtain information as to how many unprocessed workpieces have been prepared on the supplying place and/or as to how many processed workpieces are located on the ejecting place, such information can basically be obtained by the robot only. When processing accuracy of a processed workpiece is inspected by the robot, only the robot can obtain information regarding the numbers of defective products and non-defective products. Further, when a work tool is exchanged by the robot, only the robot can obtain information as to which work tool processes each workpiece. Therefore, in some cases, only the robot, not the machine tool, has the production management information, which should be managed in order to maintain processing quality.

As described above, when the machine tool has some of the production management information and the robot has the remaining information, the upper-level computer must obtain the production management information from both the machine tool and the robot. In this regard, when the production management information of the machine tool and the robot are obtained at different times, there may be an inconsistency between the information from the machine tool and the information from the robot. For example, the total number of workpieces processed by the machine tool and the total number of workpieces supplied to the machine tool by the robot may not coincide with each other.

Generally, between the machine tool and the robot, a network is arranged for executing a program or transmitting an interlock signal, etc. In addition, it is necessary to connect another network to each of the machine tool and the robot, in order that the upper-level computer can obtain the production management information from the machine tool and the robot. In other words, it is necessary to arrange two types of networks, i.e., a network for connecting the machine tool and the robot to each other, and the other network for transmitting the production management information between the upper-level computer and the machine tool and between the upper-level computer and the robot.

In addition, in the machine tool, maintenance (removal of cutting chips, and exchange of the work tool, etc.) is often carried out, and electrical power to the machine tool is usually shut-off during maintenance. While the electrical power is shut-off, the production management information cannot be obtained from the machine tool.

SUMMARY OF THE INVENTION

Therefore, an object of the present invention is to provide a robot controller configured to manage production management information of a machine tool and transmit the information to an upper-level computer, and provide a processing system including the machine tool, the robot and the robot controller.

According to one aspect of the present invention, there is provided a robot controller for controlling a robot, the robot controller and the robot being included in a system having at least one numerical controlled machine tool and an upper-level computer which manages production management information of the machine tool, the robot being configured to supply or eject an article to be processed to or from the numerical controlled machine tool, wherein the robot controller is configured to transmit at least a part of the production management information of the numerical controlled machine tool to the upper-level computer.

In a preferred embodiment, the production management information transmitted from the robot controller to the upper-level computer corresponds to aggregate information including first production management information which is previously obtained by the robot controller from the numerical controlled machine tool and second production management information associated with the robot.

According to another aspect of the present invention, a processing system comprising: at least one numerical controlled machine tool; an upper-level computer which manages production management information of the machine tool; a robot which supplies or ejects an article to be processed to or from the numerical controlled machine tool; and a robot controller which controls the robot, wherein the robot controller is configured to transmit at least a part of the production management information of the numerical controlled machine tool to the upper-level computer is provided.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
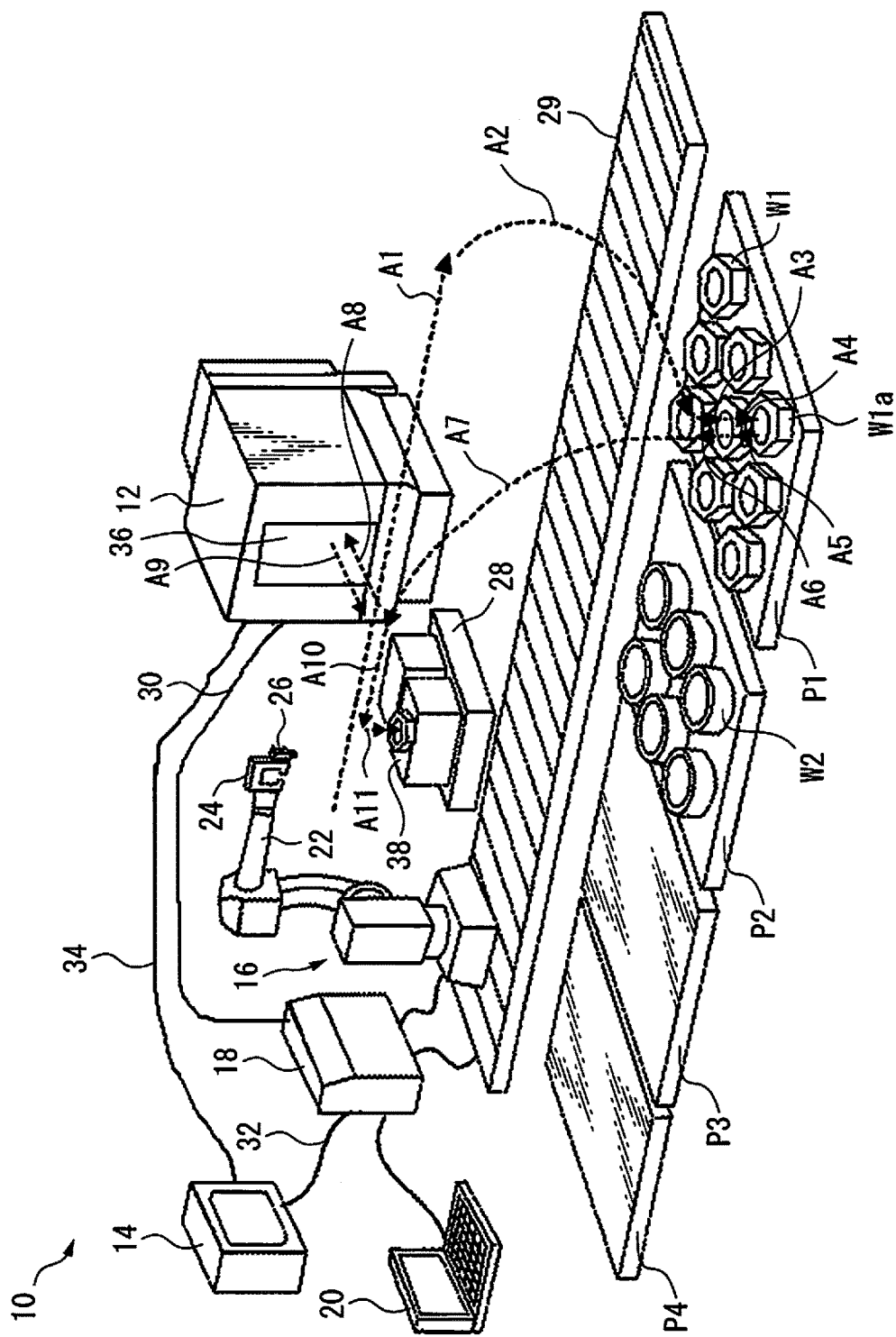
FIG. 1 is a view showing a structural example of a processing system including a robot controller according to the present invention.

FIG. 1 shows a structural example of a processing system (or a production system) including a robot controller according to the present invention. Processing system 10 includes at least one numerical controlled machine tool (or an NC machine tool) 12; an upper-level computer (or a host computer) 14 which manages production management information of machine tool 12; a robot 16 configured to supply or eject a workpiece to or from machine tool 12; a robot controller 18 which controls robot 16; and an image processor 20 connected to robot controller 18.

The workpieces (or articles) to be processed in machine tool 12 are positioned, randomly or in a line, on respective pallets by type of the workpiece. In the illustrated embodiment, two types of sets of unprocessed workpieces W1 and W2 are positioned on pallets P1 and P2, respectively.

For example, robot 16 is a multi-joint robot having six axes, and has a robot arm 22, a work tool 24 attached to a front end of robot arm 22, and a camera 26 attached to work tool 24 or the front end of robot arm 22. Camera 26 is configured to capture an image of a processed workpiece located on a temporal placement table 28, and the image obtained by camera 26 is processed by image processor 20. Controller 18 can check processing quality of the processed workpiece (or judge as to whether the processed workpiece is a defective product or a non-defective product), based on a result of image processing by image processor 20. Robot 16 is configured to convey the processed workpiece which is judged as the non-defective product to a pallet P3, and convey the processed workpiece which is judged as the defective product to a pallet P4.

Robot 16 is movable within a predetermined range along a traveling axis 29. In the embodiment of FIG. 1, robot 16 can be linearly and reciprocally moved generally in the horizontal direction. Also, robot 16 is configured to supply unprocessed workpiece W1 or W2 from pallet P1 or P2 to machine tool 12 by using work tool 24, and convey the workpiece processed by machine tool 12 to pallet P3 or P4 so as to locate the workpiece on the pallet, based on the result of image processing.

Machine tool 12 and robot controller 18 are connected to each other via a first network (cable) 30, and robot controller 18 and upper-level computer 14 are connected to each other via a second network (cable) 32. By the networks, data such as production management information as describe below can be transmitted between machine tool 12 and robot controller 18, and between robot controller 18 and upper-level computer 14. Although it is not necessary, machine tool 12 and upper-level computer 14 are connected to each other via a third network (cable) 34 in the illustrated embodiment.

Figure 2:
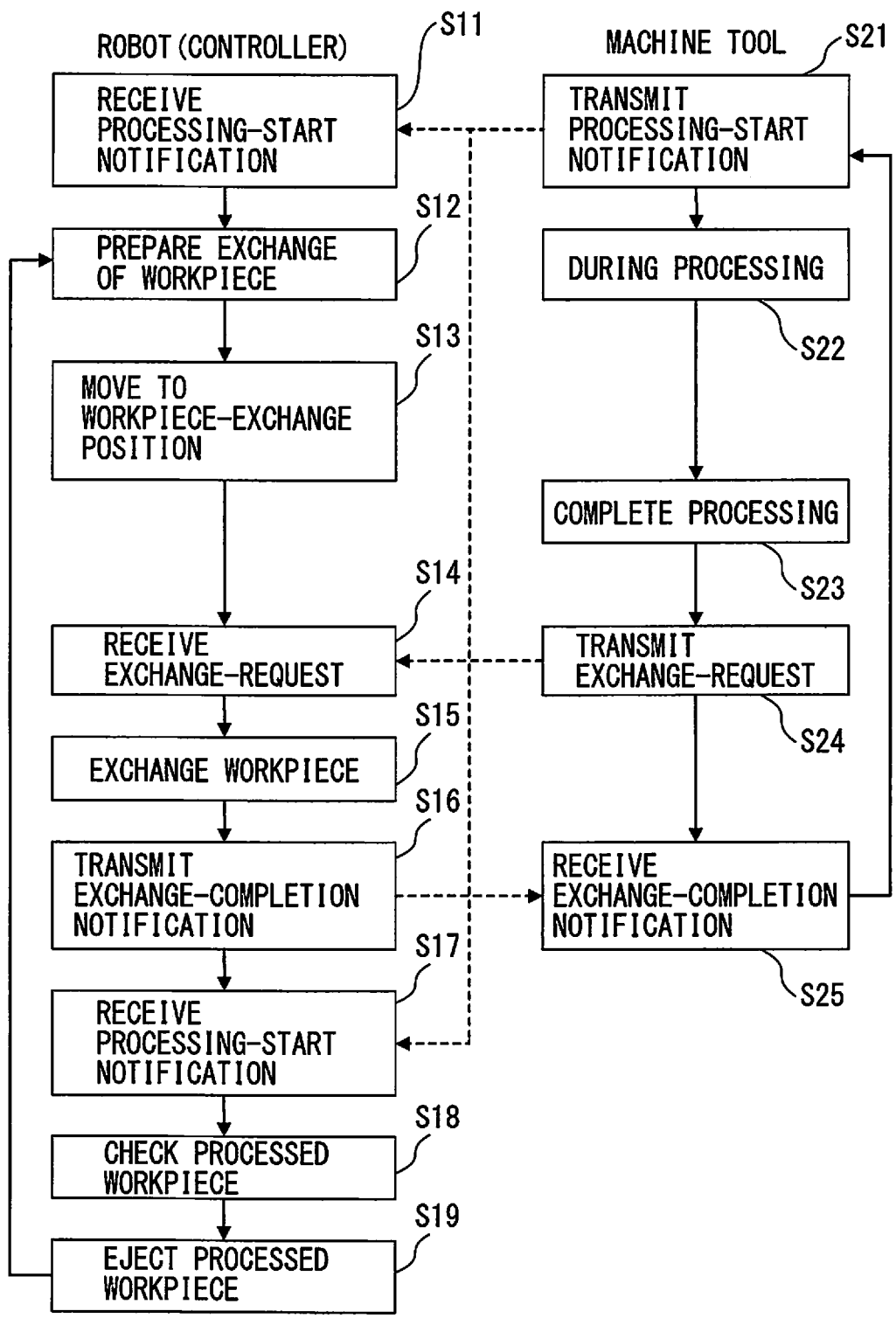
FIG. 2 is a flowchart showing an example of a procedure in a robot and a machine tool included in the processing system of FIG. 1.

Next, the procedure (herein, continuous processing of a plurality of workpieces) of robot 16 and machine tool 12 will be explained with reference to a flowchart of FIG. 2. First, the operator carries out cycle-start operation for robot controller 18 and machine tool 12. Then, machine tool 12 transmits a processing-start notification (signal) to robot controller 18 (step S21), and robot controller receives the notification signal (step S11).

After receiving the processing-start signal, robot controller 18 controls robot 16 so as to prepare a workpiece to be processed in the next processing (step S12). For example, the preparation of the workpiece to be processed may include the following operations. First, pallet P1, on which a plurality of unprocessed workpieces W1 are located, is captured by camera 26, and an image obtained by camera 26 is processed by image processor 20. Due to this image processing, the number of workpieces W1 on pallet P1 is detected, a workpiece W1a to be taken out is selected among workpieces W1, and the position of selected workpiece W1a on pallet P1 is detected. Then, robot 16 approaches pallet P1 by using traveling axis 29 (as shown by an arrow A1), work tool 24 of robot 16 approaches and grips workpiece W1a (as shown by arrows A2 to A4), and then workpiece W1a is lifted from pallet P1 (as shown by arrows A5 and A6).

After the preparation of the workpiece to be processed in the next processing is completed, robot 16 is moved to a work-exchange position (in the illustrated embodiment, in front of an automatic door 36 of machine tool 12) by using traveling axis 29 (step S13 and an arrow A7).

After transmitting the process-start signal to robot controller 18, machine tool 12 processes the workpiece positioned in machine tool 12 (step S22). After the processing is completed (step S23), machine tool 12 opens automatic door 36 and transmits a workpiece exchange-request (signal) to robot controller 18 (step S24).

After receiving the workpiece-exchange signal from machine tool 12 (step S14), robot controller 18 transmits a command to robot 16 so as to enter machine tool 12 from automatic door 36 and exchange the processed workpiece for the unprocessed workpiece (step S15 and an arrow A8). After the exchange of the workpiece by robot 16 is completed, robot controller 18 controls robot 16 so as to retract from machine tool 12 (as shown by an arrow A9), and transmits a workpiece exchange-completion notification (signal) to machine tool 12 (step S16).

After receiving the workpiece exchange-completion signal from robot controller 18 (step S25), machine tool 12 transmits the processing-start signal to robot controller 18 again (step S21), so that the next workpiece is processed. In this regard, it is preferable that robot controller 18 update the production management information with respect to machine tool 12 when robot controller 18 receives the workpiece exchange-request from machine tool 12.

After receiving the notification (signal) representing that the processing of the next workpiece is started in machine tool 12 (step S17), robot controller checks processing quality of the processed workpiece (step S18). Concretely, robot 16 conveys and locates the processed workpiece, which has been exchanged and gripped in step S15, on a predetermined place of a temporary location table 28 (as shown by arrows A10 and A11), and correctly position the workpiece by closing a positioning jig 38 on temporary location table 28. Next, the workpiece on temporary location table 28 is captured by camera 26, and an obtained image is processed by image processor 20, whereby it can be judged as to whether the processed workpiece is non-defective (pass) or defective (fail).

Next, robot 16, ejects the processed workpiece (in step S19). Concretely, the processed workpiece judged as non-defective is conveyed to pallet P3, and the processed workpiece judged as defective is conveyed to pallet P4. After the processed workpiece is ejected, the procedure in robot 16 (controller 18) is returned to step S12, so that the next workpiece to be processed is prepared.

The above procedure is repeated until the operator carries out a cycle stop operation for robot controller 18 and machine tool 12.

In the present invention, when the processing-start notification (signal) is transmitted (step S21) and/or when the workpiece exchange-request (signal) is transmitted (step S24), at least a part (preferably, all) of the production management information held by machine tool 12 is transmitted to robot controller 18 via first network 30 as described above. After receiving the production management information from machine tool 12, robot controller 18 combines (or aggregates) the information of machine tool 12 and other production management information held by robot controller 18, and the aggregated (substantially one) production management information is stored in a memory, etc., of robot controller 18.

After that, when upper-level computer 14 requests robot controller 18 or machine tool 12 to transmit the production management information, the product management information stored in robot controller 18 is transmitted via second network 32 as described above. Alternatively, even when upper-level computer 14 does not request the production management information, robot controller 18 may transmit the production management information stored in controller 18 to upper-level computer 14, at specified time intervals.

The production management information transmitted to upper-level computer 14 may be classified into groups A to G as follows.

A: Status of the machine tool (suspended, processing, waiting, etc.)

B: Energizing time, operating time, cutting time, total number of processed components and number of occurrences of an alarm in the machine tool C: Total number of processed workpieces D: Total number of inspected non-defective workpieces and inspected defective workpieces E: Starting time and ending time of processing of workpiece F: Processing time and residual lifetime of each work tool, and number of unused work tools G: Total number of unprocessed workpieces Production management information "A" can be judged based on a reception status of the processing-start notification and the exchange-request from machine tool 12. In other words, the "suspended" corresponds to a period of time from when power is applied to machine tool 12 to when robot controller 18 receives the processing-start notification, the "processing" corresponds to a period of time from when robot controller 18 receives the processing-start notification to when robot controller 18 receives the exchange-request, and the "waiting" corresponds to a period of time from when robot controller 18 receives the exchange-request to when robot controller 18 receives the next processing-start notification.

Production management information "B" is held by machine tool 12. When receiving the processing-start notification and the exchange-request, robot controller 18 can simultaneously obtain production management information "B" held be machine tool 12.

Production management information "C" and "E" can be held by both machine tool 12 and robot 16 (or robot controller 18). Every time robot controller 18 receives the processing-start notification and the exchange-request from machine tool 12, robot controller 18 obtains production management information "C" and "E," and checks as to whether obtained information "C" and "E" corresponds to production management information "C" and "E" previously held by robot controller 18. When obtained information "C" and "E" from machine tool 12 corresponds to previously held information "C" and "E," the information is transmitted to upper-level computer 14 as checked or verified production management information. On the other hand, when information "C" and "E" from machine tool 12 does not correspond to information "C" and "E" held by robot controller 18 (for example, there is a time lag between the information of machine tool 12 and the information of robot controller 18), robot controller 18 processes the information based on a predetermined algorithm, and transmits the processed information as checked or verified production management information. In this regard, the algorithm may include a priority order of the information, i.e., as to which information of machine tool 12 or robot controller 18 should be determined as the verified information.

Production management information "D" and "G" is held by robot 16 (robot controller 18) only.

Production management information "F" is held by machine tool 12 when machine tool 12 exchanges the work tool by using a tool changer, etc. On the other hand, production management information "F" is held by robot controller 18 when robot 16 exchanges the work tool of machine tool 12 for another work tool contained in a tool stocker, etc. In the present invention, upper-level computer 14 can use production management information F regardless of whether production management information F is transmitted from machine tool 12 or robot controller 18. As such, upper-level computer 14 can collectively receive the production management information from both machine tool 12 and robot controller 18. Further, the production management information is transmitted from machine tool 12 to robot controller 18 at the timing of start or end of processing (production), and the transmitted information is combined with the production management information held by robot controller 18. Therefore, in the present invention, there is no possibility of occurrence of a time lag which may be generated when production management information is separately transmitted to upper-level computer 14 from machine tool 12 and robot controller 18, and thus upper-level computer 14 can obtain correct and consistent production management information.

As explained above, in the present invention, it is not necessary that machine tool 12 and upper-level computer 14 be directly connected via third network 34, etc. In other words, the production information regarding machine tool 12 and robot 16 is collectively managed by robot controller 18. Concretely, at least a part of the production management information of machine tool 12 (in particular, information regarding groups "C" and "E" as described above) is transmitted to robot controller 18, along with a signal regarding execution of a program and/or interlock, etc., via first network 30, and then, robot controller 18 combines or aggregates the production management information from machine tool 12 and the production management information held by robot controller 18. After that, upper-level computer 14 can obtain the aggregated production management information regarding both machine tool 12 and robot 16, from robot controller 18 via network 32.

In addition, the power for machine tool 12 may be interrupted for a certain period of time, for a maintenance work such as removal of cutting chips and exchange of the work tool, etc. In the present invention, also in such a case, upper-level computer 14 can obtain the production management information of machine tool 12 from robot controller 18.

According to the present invention, the upper-level computer can obtain the production management information regarding both the machine tool and the robot can be collectively obtained, by combining or aggregating the production management information of the machine tool with the production management information of the robot held by the robot controller. Therefore, the aggregated production management information does not include inconsistent data, whereby processing quality may be maintained or improved. It is not necessary to arrange a network between the upper-level computer and the machine tool. Further, even when the power for the machine tool is shut-off for a maintenance work for the machine tool, the production management information of the machine tool can be transmitted to the upper-level computer.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot controller for controlling a robot, the robot controller and the robot being included in a system having a numerical controlled machine tool and an upper-level computer configured to manage production management information of the numerical controlled machine tool, the robot being configured to supply or eject an article to be processed to or from the numerical controlled machine tool, wherein the robot controller is configured to transmit, to the upper-level computer, at least a part of the production management information which was originally obtained by the numerical controlled machine tool and was transmitted from the numerical controlled machine tool to the robot controller, wherein the at least part of the production management information originally obtained by the numerical controlled machine tool is provided to the upper-level computer without requiring a direct network connection between the upper-level computer and the numerical controlled machine tool, wherein the upper-level computer is configured to manage the production management information for controlling the numerical controlled machine tool, wherein the robot controller is configured to
combine (i) first production management information previously transmitted to the robot controller from the numerical controlled machine tool and (ii) second production management information associated with the robot into combined production management information, and
transmit the combined production management information to the upper-level computer, and
wherein the combined production management information includes information on (a) a total number of processed workpieces and (b) a total number of inspected non-defective workpieces.

2. A processing system, comprising:
a numerical controlled machine tool;
an upper-level computer configured to manage production management information of the numerical controlled machine tool;
a robot configured to supply or eject a workpiece to be processed to or from the numerical controlled machine tool; and
a robot controller configured to control the robot,
wherein the robot controller is configured to transmit, to the upper-level computer, at least a part of the production management information which was originally obtained by the numerical controlled machine tool and was transmitted from the numerical controlled machine tool to the robot controller, wherein the at least part of the production management information originally obtained by the numerical controlled machine tool is provided to the upper-level computer without requiring a direct network connection between the upper-level computer and the numerical controlled machine tool,
wherein the upper-level computer is configured to manage the production management information for controlling the numerical controlled machine tool,
wherein the robot controller is configured to
combine (i) first production management information previously transmitted to the robot controller from the numerical controlled machine tool and (ii) second production management information associated with the robot into combined production management information, and
transmit the combined production management information to the upper-level computer, and
wherein the combined production management information includes information on (a) a total number of processed workpieces and (b) a total number of inspected non-defective workpieces.

* * * * *